United States Patent
Gong et al.

(10) Patent No.: US 11,991,130 B2
(45) Date of Patent: *May 21, 2024

(54) CUSTOMIZED CONTEXTUAL MEDIA CONTENT ITEM GENERATION

(71) Applicant: Snap Inc., Santa Monica, CA (US)

(72) Inventors: Yunchao Gong, Playa Vista, CA (US); Kirk Ouimet, Orem, UT (US)

(73) Assignee: Snap Inc., Santa Monica, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/193,636

(22) Filed: Mar. 5, 2021

(65) Prior Publication Data

US 2021/0306289 A1   Sep. 30, 2021

Related U.S. Application Data

(63) Continuation of application No. 15/409,064, filed on Jan. 18, 2017, now Pat. No. 10,951,562.

(51) Int. Cl.
*G06F 3/0481*  (2022.01)
*G06F 3/14*  (2006.01)
(Continued)

(52) U.S. Cl.
CPC ............ *H04L 51/10* (2013.01); *G06F 3/1423* (2013.01); *G06F 3/1454* (2013.01); *G06Q 30/02* (2013.01);
(Continued)

(58) Field of Classification Search
CPC ..... H04L 51/10; H04L 51/046; H04L 51/222; H04L 67/306; H04L 67/52; H04L 51/52;
(Continued)

(56) References Cited

U.S. PATENT DOCUMENTS

| 5,880,731 A | 3/1999 | Liles et al. |
| 6,023,270 A | 2/2000 | Brush et al. |

(Continued)

FOREIGN PATENT DOCUMENTS

| CA | 2887596 A1 | 7/2015 |
| CN | 101960795 | 1/2011 |

(Continued)

OTHER PUBLICATIONS

"U.S. Appl. No. 15/409,064, Final Office Action dated May 24, 2019", 17 pgs.
(Continued)

*Primary Examiner* — Cesar B Paula
*Assistant Examiner* — Zelalem Shalu
(74) *Attorney, Agent, or Firm* — Schwegman Lundberg & Woessner, P.A.

(57) ABSTRACT

Among other things, embodiments of the present disclosure improve the functionality of electronic messaging and imaging software and systems by determining topics of electronic communications between users and generating customized media content items based on such topics. The media content can be generated for a variety of topics and shared with other users. For example, media content (e.g., images or video) can be generated and displayed on a user's computing device, as well as transmitted to other users via electronic communications, such as short message service (SMS) or multimedia service (MMS) texts and mails.

20 Claims, 9 Drawing Sheets

(51) Int. Cl.
  *G06F 30/20* (2020.01)
  *G06Q 30/02* (2023.01)
  *G06Q 30/0251* (2023.01)
  *G06Q 50/00* (2012.01)
  *G06T 11/60* (2006.01)
  *H04L 12/58* (2006.01)
  *H04L 51/046* (2022.01)
  *H04L 51/10* (2022.01)
  *H04L 51/222* (2022.01)
  *H04L 67/306* (2022.01)
  *H04L 67/52* (2022.01)
  *H04W 4/14* (2009.01)
  *H04L 51/52* (2022.01)

(52) U.S. Cl.
  CPC ..... *G06Q 30/0255* (2013.01); *G06Q 30/0267* (2013.01); *G06Q 50/01* (2013.01); *H04L 51/046* (2013.01); *H04L 51/222* (2022.05); *H04L 67/306* (2013.01); *H04L 67/52* (2022.05); *H04W 4/14* (2013.01); *G09G 2370/10* (2013.01); *G09G 2370/16* (2013.01); *H04L 51/52* (2022.05)

(58) Field of Classification Search
  CPC ..... G06F 3/1423; G06F 3/1454; G06Q 30/02; G06Q 30/0255; G06Q 30/0267; G06Q 50/01; G06Q 50/30; G06Q 50/10; H04W 4/14; G09G 2370/10; G09G 2370/16; G06T 13/40
  See application file for complete search history.

(56) References Cited

U.S. PATENT DOCUMENTS

| | | | |
|---|---|---|---|
| 6,038,295 A | 3/2000 | Mattes | |
| 6,223,165 B1 | 4/2001 | Lauffer | |
| 6,772,195 B1 | 8/2004 | Hatlelid et al. | |
| 6,842,779 B1 | 1/2005 | Nishizawa | |
| 6,980,909 B2 | 12/2005 | Root et al. | |
| 7,173,651 B1 | 2/2007 | Knowles | |
| 7,342,587 B2 | 3/2008 | Danzig et al. | |
| 7,411,493 B2 | 8/2008 | Smith | |
| 7,468,729 B1 | 12/2008 | Levinson | |
| 7,535,890 B2 | 5/2009 | Rojas | |
| 7,636,755 B2 | 12/2009 | Blattner et al. | |
| 7,639,251 B2 | 12/2009 | Gu et al. | |
| 7,775,885 B2 | 8/2010 | Van Luchene et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,131,597 B2 | 3/2012 | Hudetz | |
| 8,146,005 B2 | 3/2012 | Jones et al. | |
| 8,151,191 B2 | 4/2012 | Nicol | |
| 8,199,747 B2 | 6/2012 | Rojas et al. | |
| 8,332,475 B2 | 12/2012 | Rosen et al. | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,447,516 B1 * | 5/2013 | Koulomzin | G01S 5/0295 455/456.2 |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | Andres del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,718,333 B2 | 5/2014 | Wolf et al. | |
| 8,724,622 B2 | 5/2014 | Rojas | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,874,677 B2 | 10/2014 | Rosen et al. | |
| 8,890,926 B2 | 11/2014 | Tandon et al. | |
| 8,892,999 B2 | 11/2014 | Nims et al. | |
| 8,909,679 B2 | 12/2014 | Root et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,086,776 B2 | 7/2015 | Ye et al. | |
| 9,100,806 B2 | 8/2015 | Rosen et al. | |
| 9,100,807 B2 | 8/2015 | Rosen et al. | |
| 9,105,014 B2 | 8/2015 | Collet et al. | |
| 9,191,776 B2 | 11/2015 | Root et al. | |
| 9,204,252 B2 | 12/2015 | Root | |
| 9,241,184 B2 | 1/2016 | Weerasinghe | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,443,227 B2 | 9/2016 | Evans et al. | |
| 9,460,541 B2 | 10/2016 | Li et al. | |
| 9,489,661 B2 | 11/2016 | Evans et al. | |
| 9,489,760 B2 | 11/2016 | Li et al. | |
| 9,491,134 B2 | 11/2016 | Rosen et al. | |
| 9,503,845 B2 | 11/2016 | Vincent | |
| 9,508,197 B2 | 11/2016 | Quinn et al. | |
| 9,544,257 B2 | 1/2017 | Ogundokun et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,362,219 B2 | 7/2019 | Wilson et al. | |

(56) References Cited

U.S. PATENT DOCUMENTS

| | | | |
|---|---|---|---|
| 10,475,225 B2 | 11/2019 | Park et al. | |
| 10,504,266 B2 | 12/2019 | Blattner et al. | |
| 10,573,048 B2 | 2/2020 | Ni et al. | |
| 10,657,701 B2 | 5/2020 | Osman et al. | |
| 10,951,562 B2 | 3/2021 | Gong et al. | |
| 2002/0067362 A1 | 6/2002 | Agostino Nocera et al. | |
| 2002/0169644 A1 | 11/2002 | Greene | |
| 2004/0148573 A1 | 7/2004 | Buice et al. | |
| 2005/0162419 A1 | 7/2005 | Kim et al. | |
| 2005/0206610 A1 | 9/2005 | Cordelli | |
| 2006/0294465 A1 | 12/2006 | Ronen et al. | |
| 2007/0054679 A1* | 3/2007 | Cho | H04L 51/224 455/466 |
| 2007/0113181 A1 | 5/2007 | Blattner et al. | |
| 2007/0168863 A1* | 7/2007 | Blattner | G06F 3/011 715/706 |
| 2007/0176921 A1 | 8/2007 | Iwasaki et al. | |
| 2008/0158222 A1 | 7/2008 | Li et al. | |
| 2009/0016617 A1 | 1/2009 | Bregman-amital et al. | |
| 2009/0055484 A1 | 2/2009 | Vuong et al. | |
| 2009/0070688 A1 | 3/2009 | Gyorfi et al. | |
| 2009/0076894 A1 | 3/2009 | Bates et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0203968 A1 | 8/2010 | Gill et al. | |
| 2010/0227682 A1 | 9/2010 | Reville et al. | |
| 2010/0302254 A1 | 12/2010 | Min et al. | |
| 2011/0078564 A1 | 3/2011 | Almodovar et al. | |
| 2011/0093780 A1 | 4/2011 | Dunn | |
| 2011/0115798 A1 | 5/2011 | Nayar et al. | |
| 2011/0148864 A1 | 6/2011 | Lee et al. | |
| 2011/0202598 A1 | 8/2011 | Evans et al. | |
| 2011/0239136 A1 | 9/2011 | Goldman et al. | |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2012/0209924 A1 | 8/2012 | Evans et al. | |
| 2013/0103760 A1 | 4/2013 | Golding et al. | |
| 2013/0173729 A1 | 7/2013 | Starenky et al. | |
| 2013/0201187 A1 | 8/2013 | Tong et al. | |
| 2013/0249948 A1 | 9/2013 | Reitan | |
| 2013/0257877 A1 | 10/2013 | Davis | |
| 2014/0043329 A1 | 2/2014 | Wang et al. | |
| 2014/0055554 A1 | 2/2014 | Du et al. | |
| 2014/0125678 A1 | 5/2014 | Wang et al. | |
| 2014/0129343 A1 | 5/2014 | Finster et al. | |
| 2014/0143682 A1 | 5/2014 | Druck | |
| 2014/0181229 A1 | 6/2014 | Tucker et al. | |
| 2014/0379818 A1* | 12/2014 | Cudak | H04L 51/216 709/206 |
| 2015/0046375 A1 | 2/2015 | Mandel et al. | |
| 2015/0100647 A1* | 4/2015 | Agustin | H04L 51/10 709/206 |
| 2015/0206349 A1 | 7/2015 | Rosenthal et al. | |
| 2016/0134840 A1 | 5/2016 | Mcculloch | |
| 2016/0173428 A1* | 6/2016 | Balasubramanian | G06F 16/335 709/206 |
| 2016/0196584 A1* | 7/2016 | Franklin | G06F 3/0481 715/745 |
| 2016/0234149 A1 | 8/2016 | Tsuda et al. | |
| 2016/0350953 A1* | 12/2016 | Mittelstaedt | H04L 51/043 |
| 2017/0080346 A1 | 3/2017 | Abbas | |
| 2017/0087473 A1 | 3/2017 | Siegel et al. | |
| 2017/0113140 A1 | 4/2017 | Blackstock et al. | |
| 2017/0118145 A1 | 4/2017 | Aittoniemi et al. | |
| 2017/0199855 A1 | 7/2017 | Fishbeck | |
| 2017/0235848 A1 | 8/2017 | Van Deusen et al. | |
| 2017/0310934 A1 | 10/2017 | Du et al. | |
| 2017/0312634 A1 | 11/2017 | Ledoux et al. | |
| 2018/0047200 A1 | 2/2018 | O'hara et al. | |
| 2018/0096507 A1* | 4/2018 | Valdivia | G06F 3/04842 |
| 2018/0113587 A1 | 4/2018 | Allen et al. | |
| 2018/0115503 A1 | 4/2018 | Baldwin et al. | |
| 2018/0205681 A1 | 7/2018 | Gong et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0057616 A1 | 2/2019 | Cohen et al. | |
| 2019/0188920 A1 | 6/2019 | Mcphee et al. | |
| 2021/0404837 A1* | 12/2021 | Uyeki | G06Q 50/30 |

FOREIGN PATENT DOCUMENTS

| | | | |
|---|---|---|---|
| CN | 102187362 | | 9/2011 |
| CN | 102646109 | | 8/2012 |
| CN | 102693261 | | 9/2012 |
| CN | 104969205 | | 10/2015 |
| CN | 105580035 | | 5/2016 |
| CN | 109863532 | A | 6/2019 |
| CN | 110168478 | A | 8/2019 |
| CN | 110268437 | A | 9/2019 |
| CN | 110268437 | B | 8/2023 |
| EP | 2184092 | A2 | 5/2010 |
| IN | 104781815 | | 7/2015 |
| JP | 2001230801 | A | 8/2001 |
| JP | 5497931 | B2 | 3/2014 |
| KR | 20120018708 | A | 3/2012 |
| KR | 101445263 | B1 | 9/2014 |
| KR | 20160016532 | A | 2/2016 |
| KR | 20160072467 | A | 6/2016 |
| KR | 102268907 | B1 | 6/2021 |
| WO | WO-2003094072 | A1 | 11/2003 |
| WO | WO-2004095308 | A1 | 11/2004 |
| WO | WO-2006107182 | A1 | 10/2006 |
| WO | WO-2007134402 | A1 | 11/2007 |
| WO | WO-2012139276 | A1 | 10/2012 |
| WO | WO-2013027893 | A1 | 2/2013 |
| WO | WO-2013152454 | A1 | 10/2013 |
| WO | WO-2013166588 | A1 | 11/2013 |
| WO | WO-2014031899 | A1 | 2/2014 |
| WO | WO-2014194439 | A1 | 12/2014 |
| WO | WO-2016090605 | A1 | 6/2016 |
| WO | WO-2018081013 | A1 | 5/2018 |
| WO | WO-2018102562 | A1 | 6/2018 |
| WO | WO-2018129531 | A1 | 7/2018 |
| WO | WO-2018136188 | | 7/2018 |
| WO | WO-2019089613 | A1 | 5/2019 |

OTHER PUBLICATIONS

"U.S. Appl. No. 15/409,064, Non Final Office Action dated Aug. 15, 2018", 16 pgs.

"U.S. Appl. No. 15/409,064, Non Final Office Action dated Nov. 26, 2019", 20 pgs.

"U.S. Appl. No. 15/409,064, Notice of Allowance dated Jun. 11, 2020", 15 pgs.

"U.S. Appl. No. 15/409,064, Notice of Allowance dated Nov. 12, 2020", 8 pgs.

"U.S. Appl. No. 15/409,064, Response filed Feb. 15, 2019 to Non Final Office Action dated Aug. 15, 2018", 11 pgs.

"U.S. Appl. No. 15/409,064, Response filed Feb. 26, 2020 to Non Final Office Action dated Nov. 26, 2019", 11 pgs.

"U.S. Appl. No. 15/409,064, Response filed Sep. 24, 2019 to Final Office Action dated May 24, 2019", 11 pgs.

"International Application Serial No. PCT/US2017/067394, International Preliminary Report on Patentability dated Aug. 1, 2019", 8 pgs.

"International Application Serial No. PCT/US2017/067394, International Search Report dated Apr. 16, 2018", 3 pgs.

(56) References Cited

OTHER PUBLICATIONS

"International Application Serial No. PCT/US2017/067394, Written Opinion dated Apr. 16, 2018", 6 pgs.

"Korean Application Serial No. 10-2019-7023886, Notice of Preliminary Rejection dated Sep. 8, 2020", w/ English Translation, 11 pgs.

"Korean Application Serial No. 10-2019-7023886, Response filed Nov. 9, 2020 to Notice of Preliminary Rejection dated Sep. 8, 2020", w/ English Claims, 19 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

"Chinese Application Serial No. 201780083749.9, Office Action dated Dec. 1, 2022", w English Translation, 12 pgs.

* cited by examiner

CUSTOMIZED CONTEXTUAL MEDIA CONTENT ITEM GENERATION

CROSS-REFERENCE TO RELATED APPLICATION

This application is a continuation of U.S. patent application Ser. No. 15/409,064, filed Jan. 18, 2017, which is incorporated by reference herein in its entirety.

BACKGROUND

The popularity of electronic messaging, particularly instant messaging, continues to grow. Users increasingly share media content items such as electronic images and videos with each other, reflecting a global demand to communicate more visually. Similarly, users increasingly seek to customize the media content items they share with others, providing challenges to social networking systems seeking to generate custom media content for their members. Embodiments of the present disclosure address these and other issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of electronic messaging and imaging software and systems by determining topics of electronic communications between users and generating customized media content items based on such topics. The media content can be generated for a variety of topics and shared with other users. For example, media content (e.g., images or video) can be generated and displayed on a user's computing device, as well as transmitted to other users via electronic communications, such as short message service (SMS) or multimedia service (MMS) texts and emails.

In some embodiments, customized contextual media overlays can be generated based on content provided from third-party content providers associated with a topic of discussion between a plurality of users via electronic communication. Customized contextual media overlays may also be generated to include avatars of the users involved in a discussion.

Figure 1:
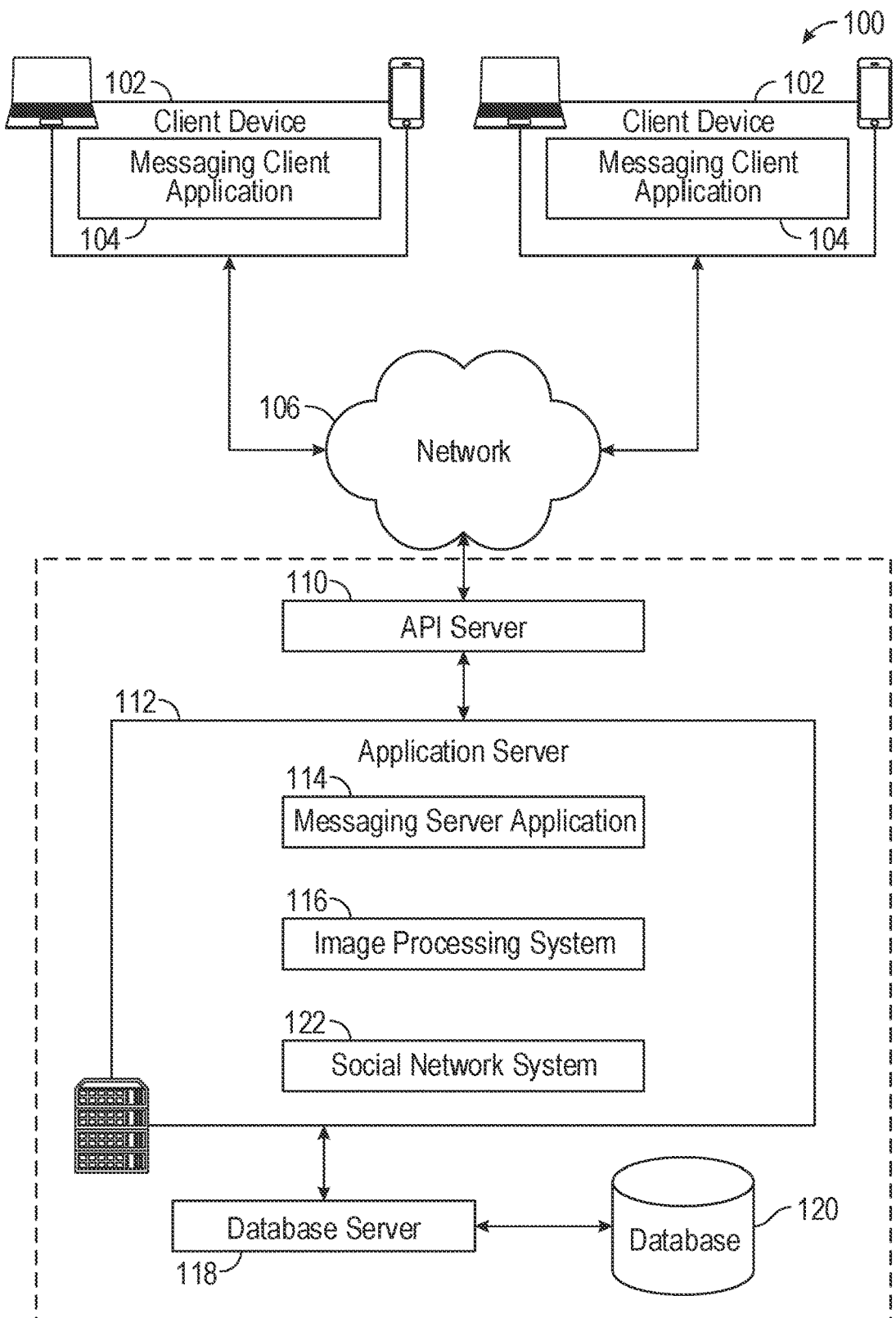
FIG. 1 is a block diagram showing an example messaging system for exchanging data (e.g., messages and associated content) over a network.

FIG. 1 is a block diagram showing an example of a messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces to a communications network (such as network 106) to obtain resources from one or more server systems or other client devices, A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of electronic media files (e.g., electronic images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to electronic images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following"; and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, or any other wearable devices.

Figure 2:
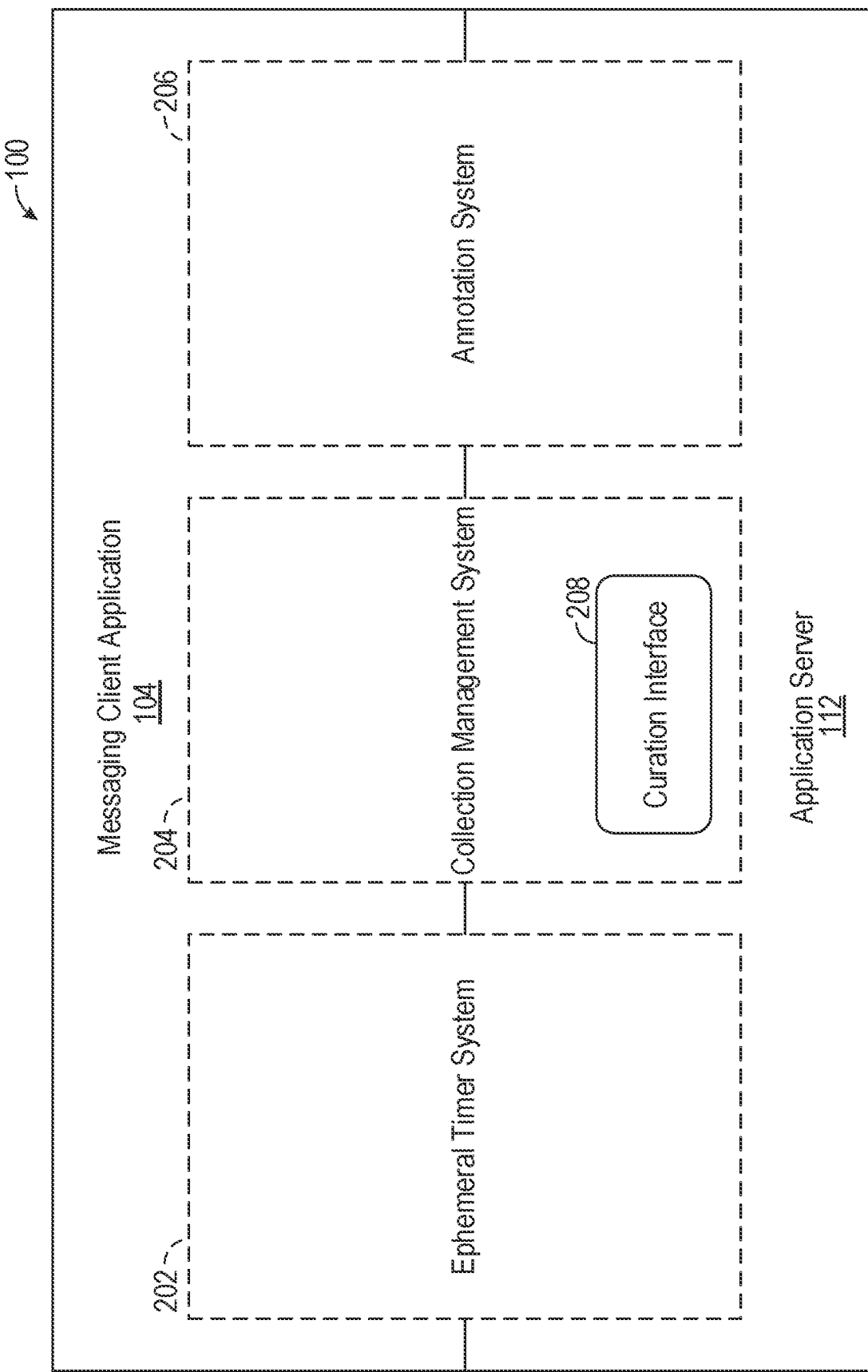
FIG. 2 is block diagram illustrating further details regarding a messaging system, according to exemplary embodiments.

FIG. 2 is block diagram illustrating further details regarding the messaging system 100, according to exemplary embodiments, Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT® story), selectively display and enable access to messages and associated content via the messaging client application 104.

The collection management system 204 is responsible for managing collections of media (e.g., collections of text, image, video and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT® filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., an image or video) at the client device 102. For example, the media overlay including text that can be overlaid on top of a photograph/electronic image generated by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some exemplary embodiments, as discussed in more detail below, embodiments of the present disclosure may generate, display, distribute, and apply media overlays to media content items. For example, embodiments may utilize media content items generated by a client device 102 (e.g., an image or video captured using a digital camera coupled to the client device 102) to generate media overlays that can be applied to other media content items.

Figure 3:
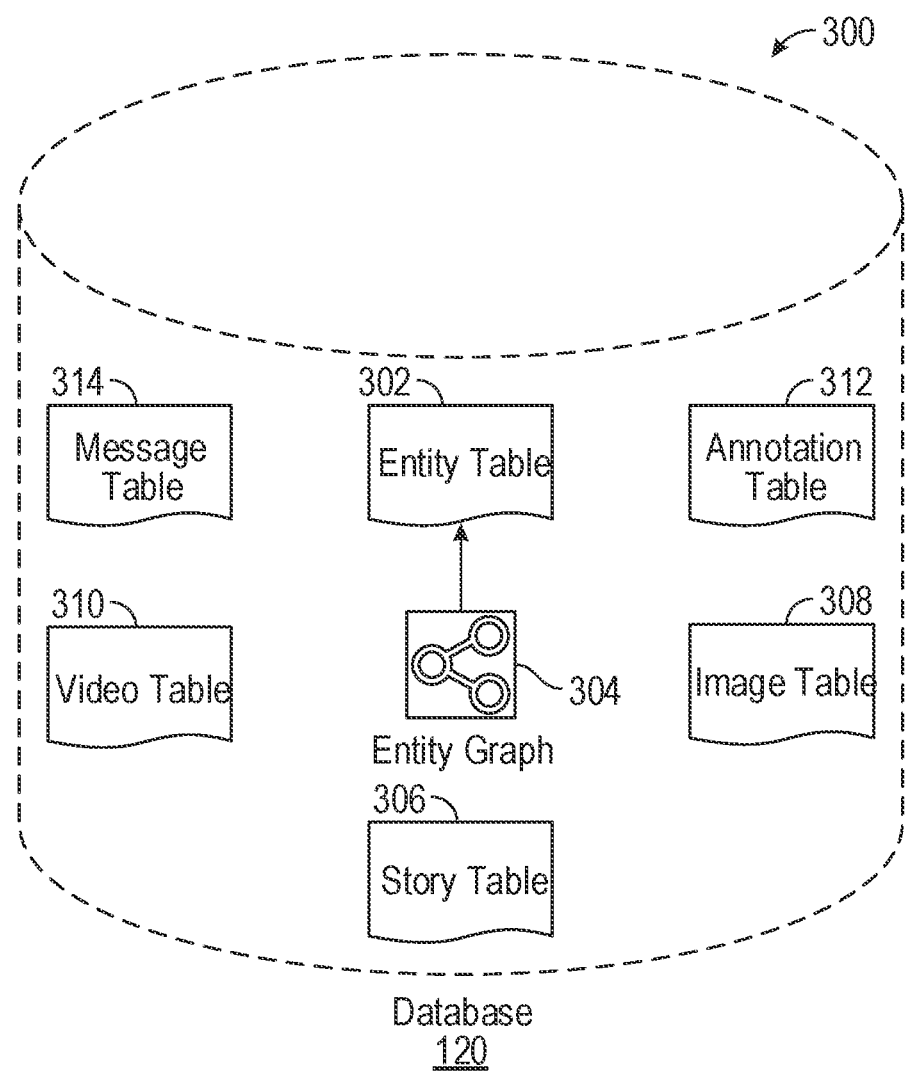
FIG. 3 is a schematic diagram illustrating data which may be stored in the database of the messaging server system, according to various exemplary embodiments.

FIG. 3 is a schematic diagram 300 illustrating data 300 that is stored in the database 120 of the messaging server system 108, according to certain exemplary embodiments. While the content of the database 120 is shown to comprise a number of tables, the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message.

Other types of filters include geolocation filters (also known as Geofilters) which may be presented to a sending user based on geographic location. For example, geolocation filters specific to a neighborhood or special location may be presented within a user interface by the messaging client application 104, based on geolocation information determined by a UPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time. Other annotation data that may be stored within the image table 308 is so-called "Lens" data. A "Lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT® story or a gallery). The creation of a particular collection may be initiated by a particular user (e.g., each user for which a record is maintained in the entity table 302). A user may create a "personal story" in the form of a collection of content that has been created and sent/broadcast by that user.

To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a ciliated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
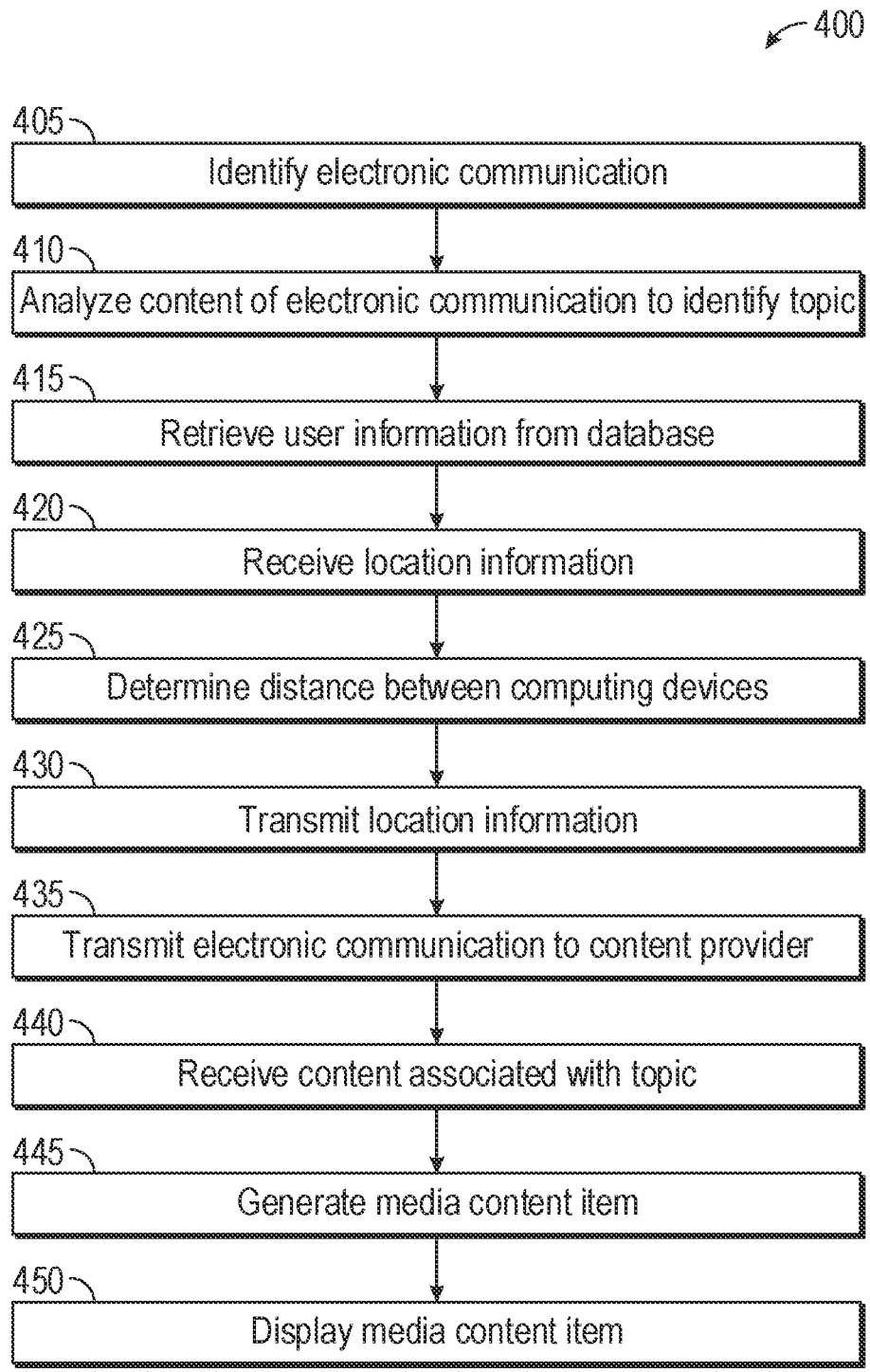
FIG. 4 is a flow diagram of an exemplary process according to various aspects of the disclosure.

Embodiments of the present disclosure may generate and present customized images for use within electronic messages/communications such as short message service (SMS) or multimedia message service (MMS) texts and emails. The customized images may also be utilized in conjunction with the SNAPCHAT stories, SNAPCHAT filters, and ephemeral messaging functionality discussed herein, FIG. 4 depicts an exemplary process according to various aspects of the present disclosure. In this example, method 400 includes identifying an electronic communication between two or more users (405), analyzing the content of the electronic communication to identify a topic of the communication (410), retrieving user information from a database (415), receiving location information (420), determining distances between two or more computing devices associated with the electronic communications (425), transmitting location information (430), transmitting an electronic communication to a content provider (435), receiving content associated with the topic (440), generating a media content item based on the content (445) and displaying the media content item on the display of a computing device (450). The steps of method 400 may be performed in whole or in part, may be performed in conjunction each other as well as with some or all of the steps in other methods, and may be performed by any number of different systems, such as the systems described in FIGS. 1 and 7.

In method 400, the system identifies (405) an electronic communication (also referred to as a "conversation" in this Application) between two or more users in order to analyze the communication (410) to identify one or more topics. As a threshold matter, the system may, prior to performing the steps of method 400, confirm authorization by one or more users to analyze the user's communications. Such authorization may be obtained via acceptance of a terms of service for utilizing an online social network or other service provided by the system, by acceptance on a case-by-case basis by the user (e.g., via popups displayed on the user's computing device) or using any other suitable method for obtaining authorization by the user(s).

In some embodiments, the system (e.g., messaging server system 108 in FIG. 1) identifies (405) an electronic communication transmitted from a first computing device of a first user to a second computing device of a second user (e.g., client devices 102 in FIG. 1) over a network such as the Internet (e.g., network 106 in FIG. 1). The system may select electronic communications for analysis based on a variety of criteria. For example, as noted above, the system may only analyze communications for which all, or some, parties to the communication have authorized the system to access. The system may also filter communications for analysis based on other criteria, such as the identity or other information regarding the users involved in the communications (see step 415 discussed below), the length of the communication, the geographical location of the users involved in the communication (see step 420 discussed below), and other information.

The system analyzes (410) the content of one or more communications to determine one or more topics discussed in the communications. In this context, a "topic" may refer to any subject associated with a communication, whether expressed implicitly or explicitly. For example, FIG. 5A displays an exemplary screen shot of electronic communications (text messages in this example) between Kirk and Yunchao. In this example, the system may analyze the communications between Kirk and Yunchao to determine that the topic of where to have lunch is associated with the communications. While the term "lunch" is explicitly referenced in Kirk's text message, the system may also determine implicit topics of conversation based on the context of the communications. For example, if Kirk were to instead text Yunchao "I'm hungry" at 11:00 PM, the system could determine, based on the timing of communication and the content of Kirk's text that the topic of the communication is likewise indicative of the topic of where to have lunch. This determination could further be based on a review of historical communications between parties. For example, if Kirk and Yunchao have a history of making lunch plans together between 11:00 PM and 11:30 PM on weekdays, the system may use such prior communications to help determine that Kirk and Yunchao are attempting to make similar plans in a current set of communications.

The system may also analyze non-text content (e.g., images or video) within electronic communications to identify a topic. For example, if Kirk were to transmit an image of a hamburger to Yunchao at 11:00 PM, the system could determine that Kirk is suggesting that he and Yunchao find a restaurant that servers hamburgers for lunch.

The system may retrieve user information (415) from a database in communication with the system (e.g., database 120 in FIG. 1) for use in analyzing communications between users, as well as to provide to content providers as discussed below. Such user information may include a user's demographic information (e.g., age, gender, etc.), date and time information associated with communications between users, location information associated with a user's computing device, and preferences of the user.

The user preferences may include any information explicitly provided to the system by the user (e.g., via a preferences menu displayed to the user on the user's computing device) as well as preference information determined for the user by the system. For example, the system may determine, based on Kirk's communications and location information from Kirk's mobile computing device that Kirk tends to favor restaurants that serve hamburgers for lunch, but tends to avoid restaurants that serve pizza for lunch.

The system may also retrieve user information from any other desired system or other source. For example, the system may receive location information (420) directly from a location sensor component (e.g., global positioning system) operating on a user's computing device. The system may also utilize location information for the computing devices of users (and other user information) to make determinations related to the user or the user's computing device. For example, the system may analyze the location information from the computing devices of two users (e.g., client devices 102 in FIG. 1) communicating with each other via text messages hosted by the system (e.g., messaging server system 108 in FIG. 1), determine the distance between the respective user computing devices (425), and transmit location information (or other user information) to one or more computing devices (430).

Figure 5A:
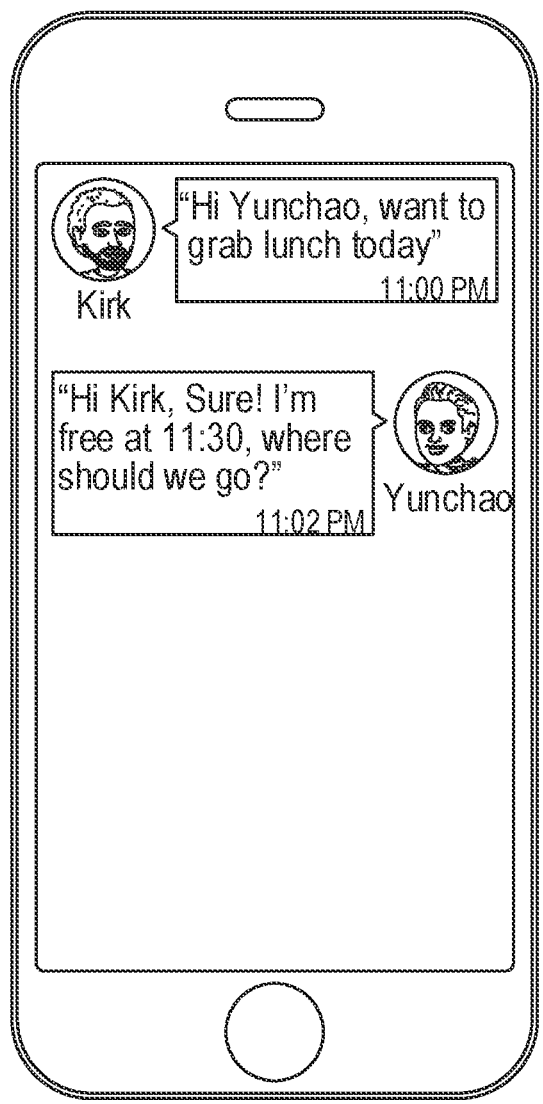
FIGS. 5A-5C are screenshots illustrating the aspects of the method described in FIG. 4.

For example, in the case of the conversation between Kirk and Yunchao in FIG. 5A, the system may receive location information (420) from Kirk's computing device and Yunchao's computing device and determine that they are both within a half mile from a restaurant called "Kirk's Burgers." The system may transmit the location information associated with Kirk's computing device to Yunchao's computing device (e.g., displayed on a map showing the location of both devices relative to the restaurant) and provide a similar display on Kirks' computing device.

The collection and display of user information from one user computing device to another user computing device may be performed for a limited, predetermined time period, example, in the case of Kirk and Yunchao arranging to have lunch, the system could cease providing the location information and map display once Kirk and Yunchao are within a predetermined distance of each other (e.g., both have arrived at the restaurant), or after a predetermined time period (e.g., 1 hour), Accordingly, the system may transmit, over the Internet, the location information associated with a first computing device (e.g., Kirk's device) to a second computing device Yunchao's device) for a predetermined time period, and transmit, over the Internet, the location information associated with the second computing device to the first computing device for the predetermined time period.

The system may also identify other users outside the communications between users using user information such as the location information and provide the users involved in a communication the option to add the additional users. For example, in conjunction with displaying Kirk and Yunchao's location information on a map relative to the "Kirk's Burgers" restaurant, the system may search (provided user authorization is given) Kirk and Yunchao's contact lists to identify the computing devices of other users who are also within a predetermined distance of Kirk's Burgers (e.g., within 1 mile, the same or less distance as either Kirk or Yunchao, etc.) or either (or both) Kirk's computing device and Yunchao's computing device. The system may prompt either or both of Kirk and Yunchao to add the identified user(s) to the electronic conversation (e.g., a group chat) and display the additional user's computing device location information along with the location information for the computing devices of Kirk and Yunchao. The list of additional users may also be filtered based on availability information (e.g., received from the respective user's calendars) to identify users that are able to meet for an activity (e.g., for lunch). The system may thus transmit location information associated with either or both the first computing device (e.g., Kirk's computing device) and the second computing device (e.g., Yunchao's computing device) to a third computing device (e.g., the device of an additional user). The system may likewise transmit the location information for the third computing device to either or both the first computing device and the second computing device. As above, location information (and other information associated with the users of the computing devices) may be transmitted for a predetermined time period, as well as until an event (e.g., the three computing devices are determined to be within a predetermined distance of a destination location) occurs.

The system transmits an electronic communication to the computing device of a content provider (435) identifying one or more topics discussed by users in their communications. In some embodiments, the system itself may be content provider, while in other embodiments a third party computing device (e.g., a server in communication with the system over the Internet) is the content provider. Just as the system may operate in conjunction with any number of users and user devices, the system may operate in conjunction with any number of different content providers.

In addition to information related to the topic discussed by users, the system may provide other information to a content provider, such as user information associated with the users in the conversation and information regarding the computing devices of the respective users in the conversation. For example, the system may include current location information associated with the respective computing devices for users in a conversation to allow the content provider to generate location-based content that is applicable to the users.

The system receives (440) content associated with the topic from the content provider, or generates the content itself if the system is performing the function of content provider. The system generates (445) a media content item based on the content, and causes the media content item to be displayed (450) on the display screens of one or more computing devices (e.g., the computing devices of the users involved in the conversation). Content associated with a topic may be in any format, such as text, an image, video, audio, or combinations thereof.

In some embodiments, the content provider may transmit content to the system that includes a template media content item with various placeholders for the system to insert content that is customized for the users involved in the conversation. In some exemplary embodiments, the content received from a content provider includes a template image containing placeholders for the avatars of one or more of the users involved in the conversation. In such cases, the system generates the media content item (445) by retrieving avatar information for one or more of the users in the conversation, and generating avatars for user(s) based on the avatar information and information in the template.

Figure 5B:
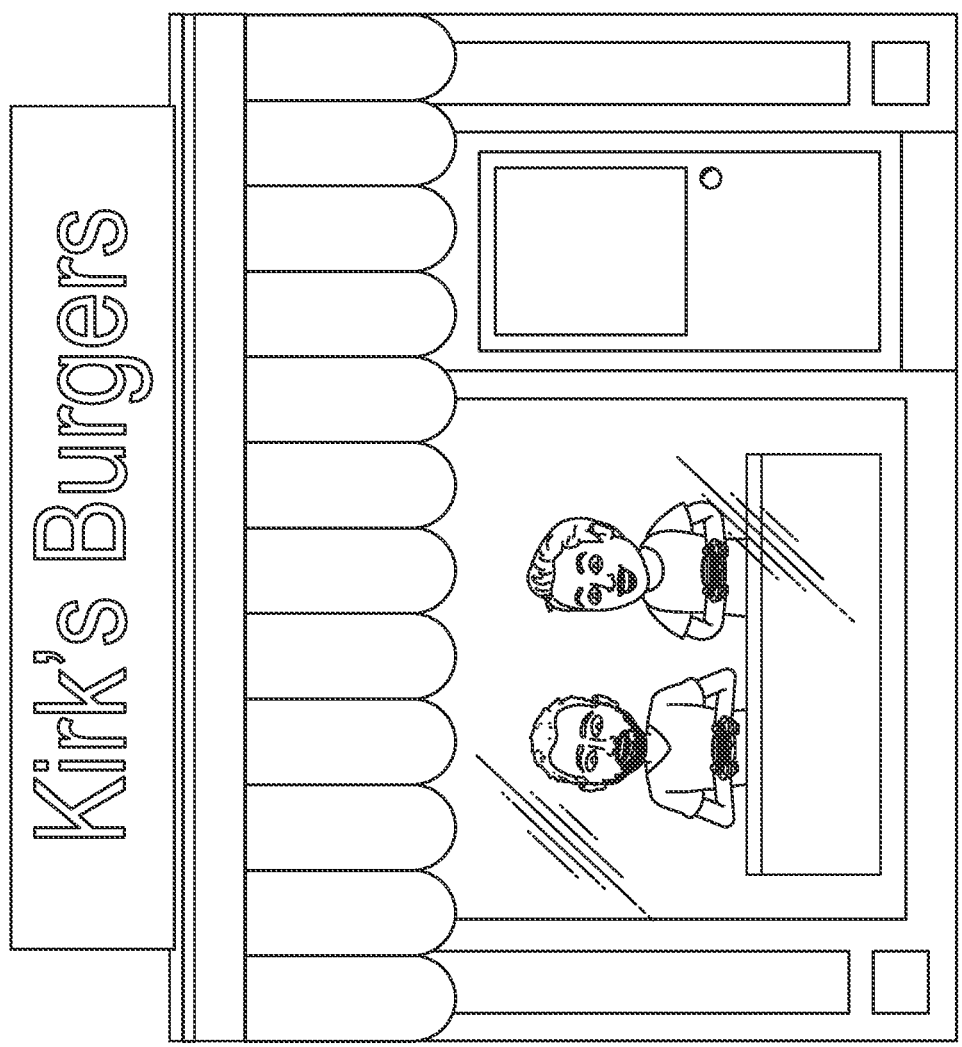

For example, consider a case where the content from the content provider is a template image containing placeholders for two users sitting in front of a restaurant. Referring now to FIG. 5B, the system takes avatar information for Kirk and Yungchao (also used to render the avatar images for Kirk and Yunchao next to their comments in FIG. 5A) and replaces the placeholder images for the generic users sitting in front of the restaurant with the avatars for Kirk and Yunchao.

The system may generate (445) multiple media content items based on the content received from the content provider. For example, the system may generate a first image corresponding to the image in FIG. 5B (with Kirk's avatar sitting on the left and Yungchao's avatar sitting on the right) and cause the first image to display (450) on the display screen of Kirk's mobile computing device. The system may additionally generate a second image with Yungchao's avatar sitting on the left and Kirk's avatar sitting on the right and cause the second image to display (450) on the display screen of Yungchao's mobile computing device. While this is a simplified example, it demonstrates how the system may provide different media content items to different users based on the same content received from a content provider.

Figure 5C:
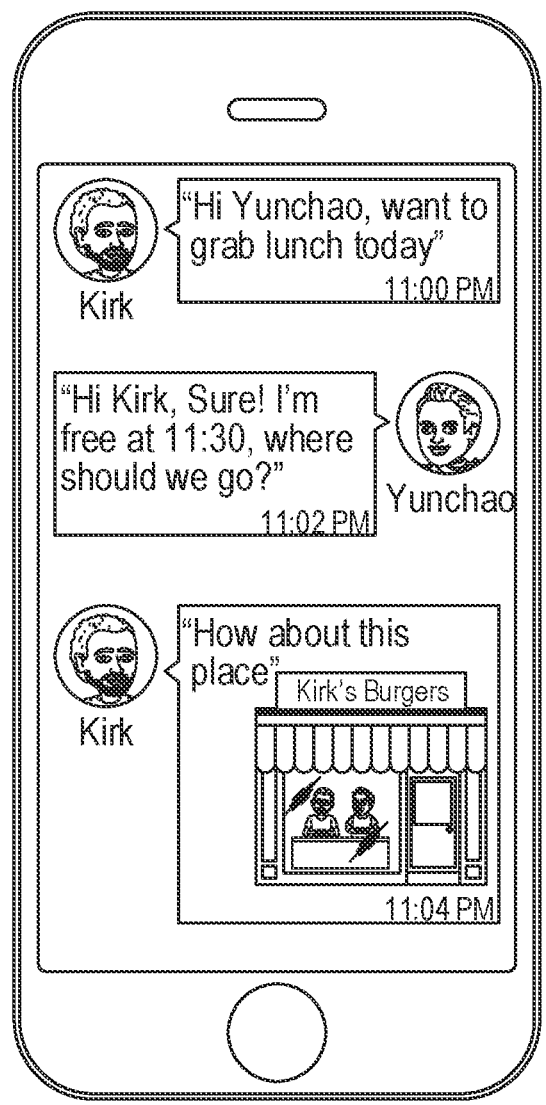

The media content items may be displayed (450) in a variety of different ways. For example, the system may display a generated media content item in a gallery presented on the display screen of a users' computing device that the user can select and include within electronic communications to other users. Referring now to FIG. 5C, for example, the media content item generated in FIG. 5B (i.e., an image in this example) is selected by Kirk for inclusion in his message back to Yungchao suggesting they go to Kirk's Burgers.

In some embodiments, the system may generate multiple media content items based on content received from the content provider, and display such content items in response to actions taken by the users involved in the conversation. Continuing with the example shown in FIG. 5C, the system may generate a response image or other media content item based on Kirk's inclusion of the image from FIG. 5B in his message to Yungchao, and display the response image in Yunchao's gallery of possible images to send to Kirk. For example, the response media content item could include an image, video, or other content depicting Yungchao's avatar eating a hamburger to indicate Yungchao is in favor of going to Kirk's Burgers for lunch. Conversely, the system could generate a response image showing Yungchao's avatar holding his nose at the sight of a hamburger, indicating Yungchao is not in favor of Kirk's lunch proposal.

A variety of media content items may be generated (445) and displayed (450) in conjunction with embodiments of the present disclosure. In this context, a "media content item" may include any type of electronic media in any format. For example, a media content item may include an image in JPG format, an image in PNG format, a video in FIN format, a video in AVI format, etc. In some exemplary embodiments, a media content item may include content that is captured using an image capture device or component (such as a digital camera) coupled to, or in communication with, a system performing the functionality of method 400. In the exemplary system 700 depicted in FIG. 7 may include a digital camera as one of input components 728. Additionally or alternatively, the media content item may be received from another system or device. In FIG. 1, for example, a client device 102 performing the functionality of method 400 may receive a media content item from another client device 102 or other system via network 106.

In some embodiments, the media content item generated (445) by the system may be included in a media overlay such as a "sticker" (i.e., an image that can be overlaid onto other images), filter (discussed above), or another media overlay. Such overlays may include static (i.e., non-moving) features as well as dynamic (i.e., moving) features.

Generation of the media content item (445) may include the generation of one or more data structure fields containing information regarding the content item. For example, the system may generate a name field in a data structure for the media overlay that includes a name for the media content item received from the content provider.

Figure 6:
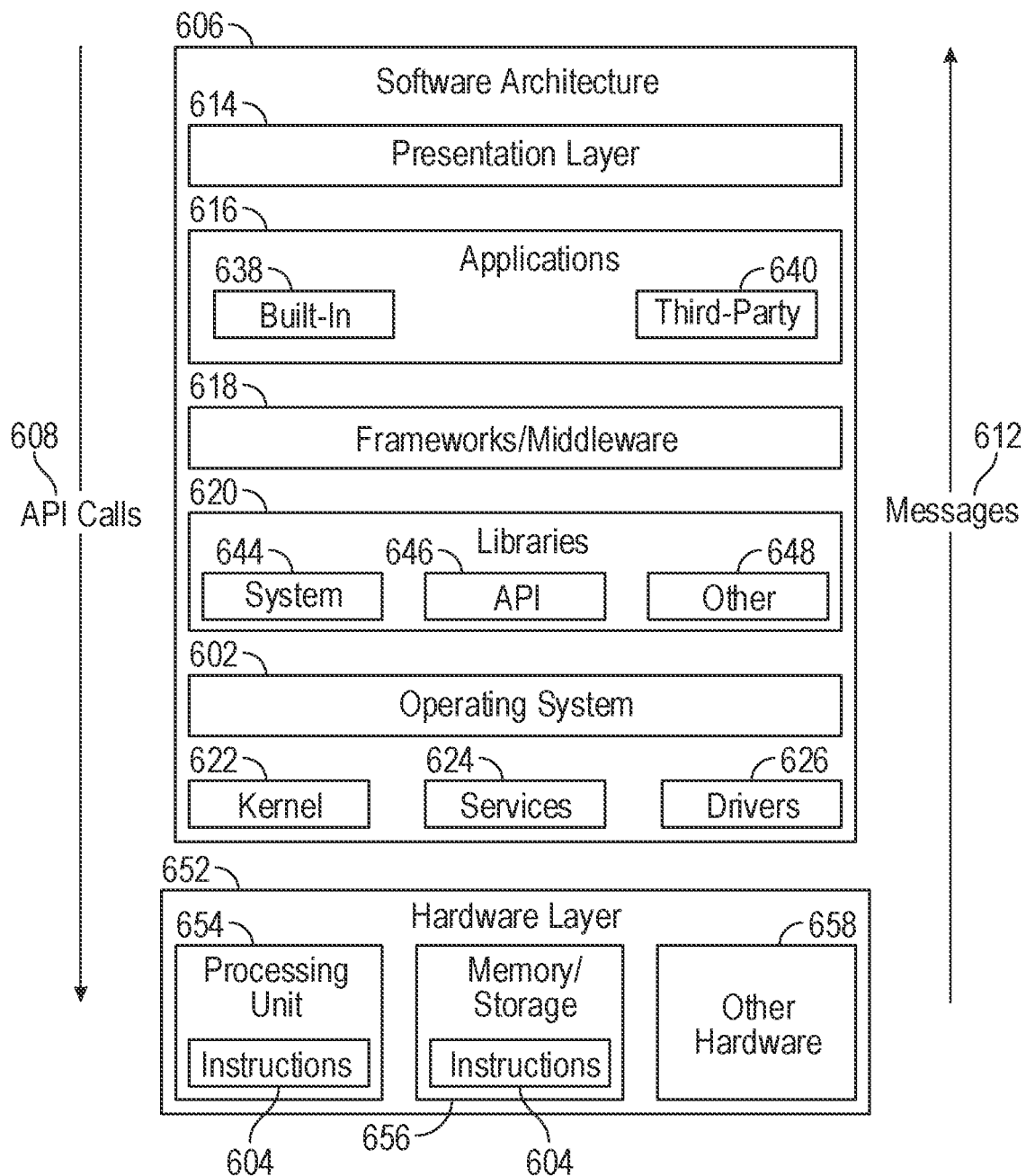
FIG. 6 is a block diagram illustrating a representative software architecture, which may be used in conjunction with various hardware architectures herein described.

Embodiments of the present disclosure may transmit and receive electronic communications containing media content items, media overlays, or other content any form of electronic communication, such as SMS texts. MMS texts, emails, and other communications. Media content items included in such communications may be provided as attachments, displayed inline in the message, within media overlays, or conveyed in any other suitable manner, Software Architecture FIG. 6 is a block diagram illustrating an exemplary software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein, A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 or other components within the layers may invoke application programming interface (API) API calls 608 through the software stack and receive messages 612 in response to the API calls 608. The layers illustrated are representative in nature and not all software architectures have all layers, example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-fig drivers, audio drivers, power management drivers, and so forth depending on the hardware configuration.

The libraries 620 provide a common infrastructure that is used by the applications 616 or other components or layers. The libraries 620 provide functionality that allows other software components to perform tasks in an easier fashion than to interface directly with the underlying operating system 602 functionality (e.g., kernel 622, services 624 or drivers 626). The libraries 620 may include system libraries 644 (e.g., C standard library) that may provide functions such as memory allocation functions, string manipulation functions, mathematical functions; and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 or other software components/modules, some of which may be specific to a particular operating system 602 or platform.

The applications 616 include built-in applications 638 or third-party applications 640. Examples of representative built-in applications 638 may include, but are not limited to, a contacts application, a browser application, a book reader application, a location application, a media application, a messaging application, or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 or drivers 626), libraries 620, and frameworks middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
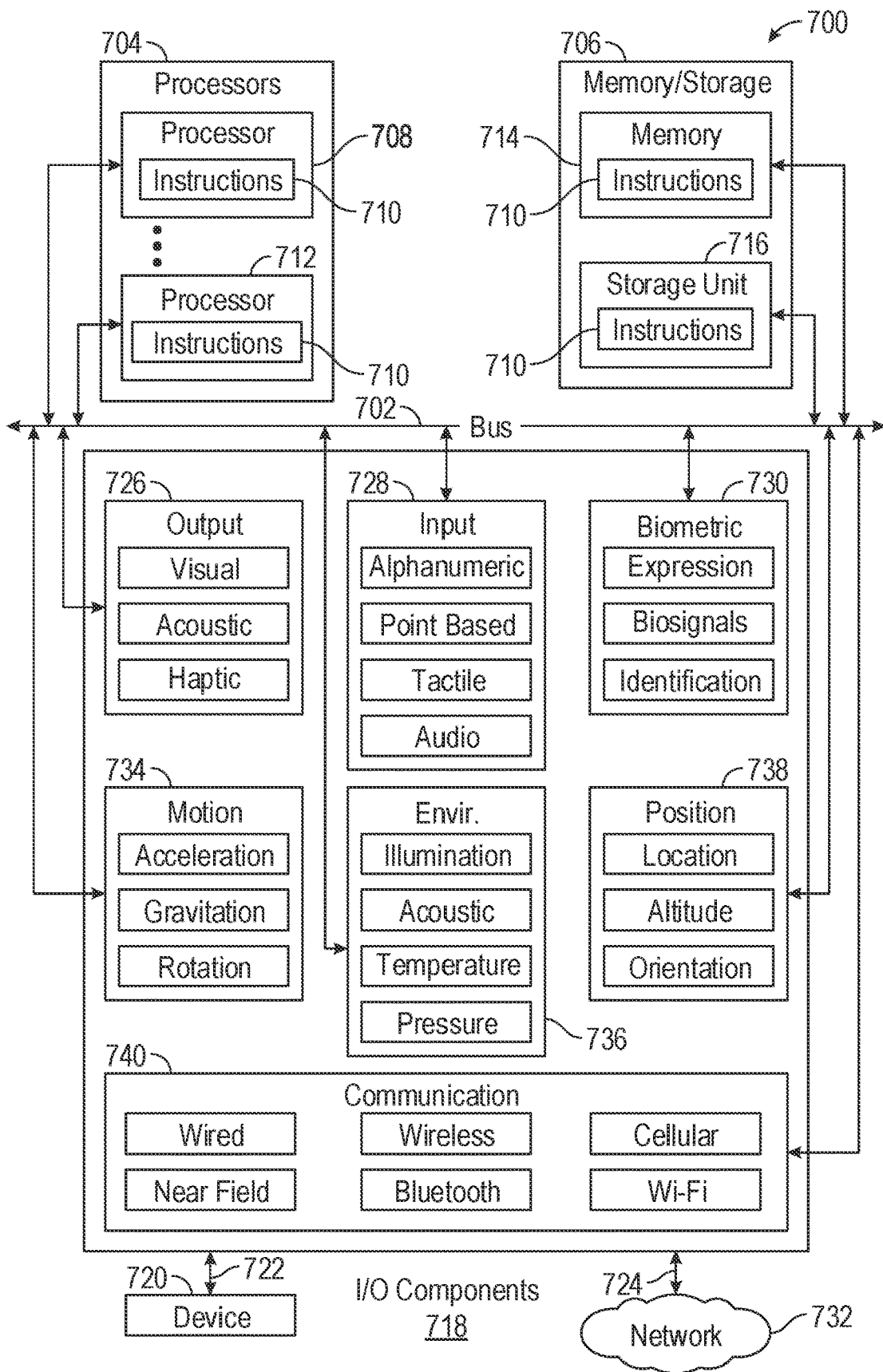
FIG. 7 is a block diagram illustrating components of a machine, according to some exemplary embodiments, able to read instructions from a machine-readable medium (e.g., a machine-readable storage medium) and perform any one or more of the methodologies discussed herein.

7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following, discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 728 may also include one or more image-capturing devices, such as a digital camera for generating digital images or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combinations thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, velocity sensor components (e.g., speedometer), rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732, In further examples, communication components 740 may include—wired communication components, wireless communication components, cellular communication components, Near Field Communication (NFC) components, Bluetooth® components (e.g., Bluetooth® Low Energy), Wi-Fit components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NIT beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in t e drawings that form a part of this document: Copyright 2016, SNAP, INC. 2016, All Rights Reserved.

Changes and modifications may be made to the disclosed embodiments without departing from the scope of the present disclosure. These and other changes or modifications are intended to be included within the scope of the present disclosure, as expressed in the following claims.

What is claimed is:
1. A system comprising:
a processor;
a user interface coupled to the processor, the user interface comprising an input device and a display screen; and memory coupled to the processor and storing instructions that, when executed by the processor, cause the system to perform operations comprising:

determining a topic associated with an electronic communication exchanged between a first computing device of a first user and a second computing device of a second user;

receiving media content associated with the topic;

generating, based on the media content, a first image and a second image, the first image including the media content and a first display arrangement of an avatar of the first user and an avatar of the second user, and the second image including the media content and a second display arrangement of the avatar of the first user and the avatar of the second user, the second display arrangement being different from the first display arrangement; and causing display of the first image on the first computing device and display of the second image on the second computing device.

2. The system of claim 1, the operations further comprising:

retrieving, from a database coupled to the system, user information including one or more of: information associated with the first user and information associated with the second user; and transmitting the user information in the electronic communication to a media content provider from which the media content associated with the topic was received.

3. The system of claim 2, wherein the user information includes one or more of: demographic information, a time of communications between the first user and the second user, location information associated with one or more of the first computing device and the second computing device, and user preferences.

4. The system of claim 1, wherein generating the first image includes:

retrieving, from a database coupled to the system, avatar information for the first user or the second user.

5. The system of claim 4, wherein the first media content associated with the topic includes a template image, and wherein generating the first image includes replacing placeholder avatar images within the template image with respective avatars of the first user and the second user.

6. The system of claim 1 wherein the first image is displayed on the second computing device in response to determining, by the system, that the first user includes the first image in an electronic communication transmitted from the first computing device to the second computing device.

7. The system of claim 1, the operations further comprising:

receiving location information associated with the first computing device and location information associated with the second computing device;

transmitting the location information associated with the first computing device to the second computing device for a predetermined time period; and transmitting the location information associated with the second computing device to the first computing device for the predetermined time period.

8. The system of claim 7, the operations further comprising:

receiving, from a third computing device of a third user, location information associated with the third computing device;

determining, based on the location information associated with the first computing device and the location information associated with the third computing device, that the first computing device and the third computing device are within a predetermined distance from each other; and in response to determining that the first computing device and the third computing device are within a predetermined distance from each other:

transmitting the location information associated with the first computing device to the third computing device for the predetermined time period; and transmitting the location information associated with the third computing device to the first computing device for the predetermined time period.

9. A computer-implemented method comprising:

determining, by a computer system, a topic associated with an electronic communication exchanged between a first computing device of a first user and a second computing device of a second user;

receiving, by the computer system, media content associated with the topic;

generating, by the computer system and based on the media content, a first image and a second image, the first image including the media content and a first display arrangement of an avatar of the first user and an avatar of the second user, and the second image including the media content and a second display arrangement of the avatar of the first user and the avatar of the second user, the second display arrangement being different from the first display arrangement; and causing, by the computer system, display of the first image on the first computing device and display of the second image on the second computing device.

10. The method of claim 9, further comprising:

retrieving, from a database coupled to the computer system, user information including one or more of: information associated with the first user and information associated with the second user; and transmitting the user information in the electronic communication to a media content provider from which the media content associated with the topic was received.

11. The method of claim 10, wherein the user information includes one or more of: demographic information, a time of communications between the first user and the second user, location information associated with one or more of the first computing device and the second computing device, and user preferences.

12. The method of claim 9, wherein generating the first image includes:

retrieving, from a database coupled to the system, avatar information for the first user and the second user.

13. The method of claim 12, wherein the media content associated with the topic includes a template image, and wherein generating the first image includes replacing placeholder avatar images within the template image with respective avatars of the first user and the second user.

14. The method of claim 9, wherein the first image is displayed on the second computing device in response to determining, by the computer system, that the first user includes the first image in an electronic communication transmitted from the first computing device to the second computing device.

15. The method of claim 9, further comprising:

receiving, by the computer system, location information associated with the first computing device and location information associated with the second computing device;

transmitting, by the computer system, the location information associated with the first computing device to the second computing device for a predetermined time period; and transmitting, by the computer system, the location information associated with the second computing device to the first computing device for the predetermined time period.

16. The method of claim 15, further comprising:

receiving, by the computer system from a third computing device of a third user, location information associated with the third computing device;

determining, by the computer system based on the location information associated with the first computing device and the location information associated with the third computing device, that the first computing device and the third computing device are within a predetermined distance from each other; and in response to determining that the first computing device and the third computing device are within a predetermined distance from each other:

transmitting, by the computer system, the location information associated with the first computing device to the third computing device for the predetermined time period; and transmitting, by the computer system, the location information associated with the third computing device to the first computing device for the predetermined time period.

17. A non-transitory computer-readable medium storing instructions that, when executed by a computer system, cause the computer system to perform operations comprising:

determining a topic associated with an electronic communication exchanged between a first computing device of a first user and a second computing device of a second user;

receiving media content associated with the topic;

generating, based on the media content, a first image and a second image, the first image including the media content and a first display arrangement of an avatar of the first user and an avatar of the second user, and the second image including the media content and a second display arrangement of the avatar of the first user and the avatar of the second user, the second display arrangement being different from the first display arrangement; and causing display of the first image on the first computing device and display of the second image on the second computing device.

18. The non-transitory computer-readable medium of claim 17, the operations further comprising:

retrieving, from a database coupled to the computer system, user information including one or more of: information associated with the first user and information associated with the second user; and transmitting the user information in the electronic communication to a media content provider from which the media content associated with the topic was received.

19. The non-transitory computer-readable medium of claim 18, wherein the user information includes one or more of: demographic information, a time of communications between the first user and the second user, location information associated with one or more of the first computing device and the second computing device, and user preferences.

20. The system of claim 1, wherein the first image further includes an avatar of the second user overlaid on the media content.

\* \* \* \* \*